May 11, 1943.　　　　G. W. NEELY　　　　2,319,152
INSULATOR
Filed March 17, 1941
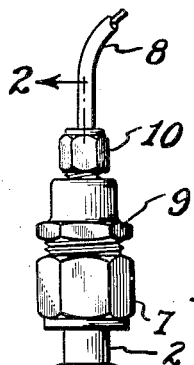
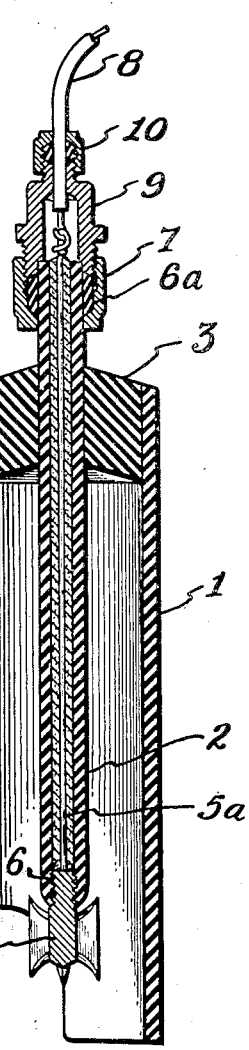
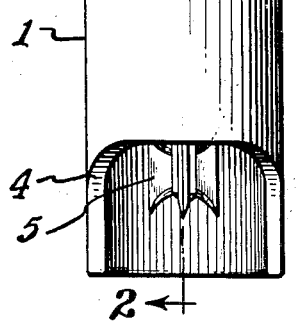
INVENTOR.
GLEN W. NEELY.
BY Allen & Allen
ATTORNEYS.

Patented May 11, 1943

2,319,152

UNITED STATES PATENT OFFICE 2,319,152

INSULATOR

Glen W. Neely, River Forest, Ill., assignor to The Richardson Company, Lockland, Ohio, a corporation of Ohio Application March 17, 1941, Serial No. 383,669

6 Claims. (Cl. 174—138)

My invention relates to insulators for retaining electrodes in instances where the electrode is to be subjected to an electrolytic liquid, and it is desired to protect the insulator against becoming coated with a film or encrustation which will result in faulty activity of the electrode.

In U. S. Letters Patent No. 2,229,036, dated January 21, 1941, there is shown an insulator for the purpose of my present structure and the desirable functions thereof explained.

It is my object to provide such an insulator from condensation product material, and to make it inexpensively and effectively. My structure is designed, for example, to be constructed of laminated synthetic resinous condensation material tubing, assembled together. I provide for sealing the structure against absorption of moisture, and for the complete protection of all electrical connections. I provide for a simple mode of arranging the electrode and protecting the electrode itself against becoming damaged by being accidentally struck by workmen etc. while still exposing it for its full activity.

I accomplish my objects by that certain construction and arrangement of parts to be hereinafter more specifically pointed out by reference to a specific example, and the novelty whereof will be set forth in the appended claims to which reference is hereby made.

In the drawing:

Figure 1 is a side elevation of the insulator with the electrode attached.

Figure 2 is a section on the line 2—2 of Figure 1.

Figure 3 is a bottom plan view of the complete structure.

In making up my insulator I utilize as the outer member of sleeve 1 a section of laminated synthetic resin product which has been consolidated by heat and pressure. For the rod portion 2 of the insulator, I utilize a piece of laminated tubing of the same type, only of a small bore and diameter.

As a plug 3, I employ a short section of heavy walled laminated tubing of the same material. It is not necessary that the three tubular sections be of the same identical synthetic resin, but the several pieces are consolidated when assembled.

The rod portion 2 is forced into the orifice in the plug member 3, and the plug member 3 is forced into the one end of the sleeve portion 1. It is desirable to employ a binder to coat the parts which are to be forced together, such as a synthetic resin in solvent form, which will amalgamate with the substance of the resinous elements assembled.

The sleeve portion has a notch 4 cut therein, as indicated and the rod portion is arranged so that its lower end is disclosed by the notch, but is covered by the rest of the sleeve. When the insulator is in place the notch will be oriented so that it faces toward a wall or some other obstruction, and hence the electrode on the end of the rod will not be exposed to accidental contact.

The lower end of the rod is provided preferably with an internal thread for reception of the stem of the electrode. With a modified electrode stem the exterior of the rod might be the threaded portion. As shown the electrode 5 has a stem 6, which screws into the lower end of the passage in the rod. Connected to the electrode is a wire 5a which extends through the passage of the tube to the upper end.

I provide a rubber ring 6a which fits snugly over the upper end of the rod where it protrudes through the plug. Between the washer and the plug, a female coupling sleeve 7 is slipped over the rod prior to mounting the rubber ring. On the connector wire or cable 8 I place the male coupling member 9 with a stuffing box 10 secured thereto at its upper end.

By connecting up the cable 8 to the wire 5a, and screwing the male into the female coupling, with the rubber ring acting as a gasket between the two, as shown, a tight connection is formed which seals the exposed upper end of the rod member.

Prior to inserting the electrode and making the connections last above described, the assembly of tubular portions making up the insulator proper is dipped in a synthetic resin varnish and then baked. This results in sealing the laminated consolidation product pieces against absorbing moisture. The practice of so protecting such materials from moisture absorption is known in the art, and various materials can be employed, preferably a synthetic resin substance in a solvent which will also penetrate the substance of the cured laminated material.

When the electrode is inserted, I will pour into the passageway of the rod member a sealing compound of suitable type, for example a heat plastic bituminous substance, to prevent any leakage through the passageway of the rod.

As so constructed, the insulator is inexpensive, provides an air space against liquid rising to cover the rod element and is little trouble to make, while having a long life and complete effectiveness in use. As one point of use the insulator is used, as indicated in the Bird patent above identified, in detecting the rise of sea water in enclosed chambers of sea going vessels.

Having thus described my invention what I claim as new and desire to secure by Letters Patent is:

1. An insulator for the purpose described comprising a sleeve in the form of an elongated tube, a plug, and a hollow rod formed of laminated synthetic resinous material, assembled so that the plug closes one end of the sleeve, and the rod projects lengthwise into and substantially through the sleeve and passes through the plug and therebeyond, the fit of the plug in the sleeve and the rod in the plug being tight against leakage, said rod at its end within said sleeve having means whereby an electrode may be attached to it with a conductor from said electrode passing through said rod, said rod having means at its other end whereby a moisture-tight connection may be made between said rod and said conductor.

2. An insulator for the purpose described comprising a sleeve in the form of an elongated tube, a plug, and a hollow rod formed of laminated synthetic resinous material, assembled so that the plug closes one end of the sleeve, and the rod projects lengthwise into and substantially through the sleeve and passes through the plug and therebeyond, the fit of the plug in the sleeve and the rod in the plug being tight against leakage, there being a sealing compound inserted between the said parts where assembled, said rod at its end within said sleeve having means whereby an electrode may be attached to it with a conductor from said electrode passing through said rod, said rod having means at its other end whereby a moisture-tight connection may be made between said rod and said conductor.

3. The structure claimed in claim 1 wherein said sleeve has a notched formed in its free end, and said rod projects through said sleeve to intercept said notch but terminates short of the extreme end of said sleeve.

4. The structure claimed in claim 1 wherein the sleeve, the plug and the rod as a unitary assembly are coated with a baked sealing coat to seal the assembly against moisture absorption.

5. An insulator for the purpose described comprising a sleeve, a plug and a hollow rod formed of laminated synthetic resinous material, assembled so that the plug closes one end of the sleeve, and the rod projects lengthwise through the sleeve and projects through the plug, the fit of the plug in the sleeve and the rod in the plug being tight against leakage, said rod having its lower end threaded to receive an electrode, and a gasketed coupling at the upper end of the rod.

6. An insulator for the purpose described comprising a sleeve, a plug and a hollow rod formed of laminated synthetic resinous material, assembled so that the plug closes one end of the sleeve, and the rod projects lengthwise through the sleeve and projects through the plug, the fit of the plug in the sleeve and the rod in the plug being tight against leakage, said rod having a lower end upon which an electrode may be mounted, and the passageway therein being arranged for a conductor to extend therethrough from the electrode, and the passageway being filled with a sealing compound applied after the electrode is in place.

GLEN W. NEELY.